(12) United States Patent
Jahn et al.

(10) Patent No.: US 8,619,269 B2
(45) Date of Patent: Dec. 31, 2013

(54) PROCESSING A GROUP OF JOBS SUBSTANTIALLY INDEPENDENTLY WHILE SYNCHRONIZING AND MAINTAINING THE ORIGINAL ORDER OF THE JOBS AT APPROPRIATE POINTS IN A WORKFLOW

(75) Inventors: Janeen E. Jahn, Lafayette, CO (US);
Kyle P. Manning, Lafayette, CO (US);
Dwight R. Palmer, Longmont, CO (US); Marquis G. Waller, Louisville, CO (US)

(73) Assignee: Ricoh Production Print Solutions, Boulder, CO (US)

( * ) Notice: Subject to any disclaimer, the term of this patent is extended or adjusted under 35 U.S.C. 154(b) by 1255 days.

(21) Appl. No.: 11/777,813

(22) Filed: Jul. 13, 2007

(65) Prior Publication Data
US 2009/0015860 A1    Jan. 15, 2009

(51) Int. Cl.
*G06K 1/00* (2006.01)

(52) U.S. Cl.
USPC .......................................................... 358/1.1

(58) Field of Classification Search
USPC ................................................. 358/1.15, 1.1
See application file for complete search history.

(56) References Cited

U.S. PATENT DOCUMENTS

| | | | |
|---|---|---|---|
| 7,065,567 B1 | 6/2006 | Squires et al. | |
| 7,079,266 B1 * | 7/2006 | Rai et al. ...................... | 358/1.13 |
| 2002/0060807 A1 | 5/2002 | Gassho et al. | |
| 2002/0080402 A1 * | 6/2002 | Robinson et al. ............ | 358/1.15 |
| 2003/0090714 A1 * | 5/2003 | Sandhaus ...................... | 358/1.15 |
| 2004/0196470 A1 | 10/2004 | Christiansen | |
| 2005/0018229 A1 | 1/2005 | Gusler et al. | |
| 2005/0248804 A1 * | 11/2005 | Goel et al. .................... | 358/1.15 |
| 2006/0126105 A1 * | 6/2006 | Sedky et al. .................. | 358/1.15 |
| 2006/0197977 A1 | 9/2006 | Miyata | |
| 2006/0238800 A1 | 10/2006 | Czudak et al. | |
| 2007/0097409 A1 * | 5/2007 | Goings et al. ................ | 358/1.14 |
| 2007/0229883 A1 * | 10/2007 | Fujimori et al. ............. | 358/1.15 |

OTHER PUBLICATIONS

*A JDF-Based Business Solution Concept for Automated Print Management*; Screen, Newsbox, vol. 14-2,http://www.screen.co.jp/ga_news/vol14_pdf/newsbox_14_2.pdf.
*RPM Remote Print Manager*; Datasheet, Brooks Internet Software, Inc., http://www.brooksnet.com/datasheets/remoteprintmanager.pdf.
Interquest, Ltd.; *FreeFlow Variable Information Workflow*; Xerox Corporation, White Paper, 2004, http://www.xerox.com/downloads/usa/en/s/solutions_digital_workflow_whitepaper_vipp.pdf.
*EFI Print Management Solutions*; EFI, Inc., 2007, http://www.efi.com/products/print-mis/integrated-products/efi-printflow/.

* cited by examiner

*Primary Examiner* — Eric A Rust
(74) *Attorney, Agent, or Firm* — Duft Bornsen & Fettig LLP

(57) ABSTRACT

Methods and systems for improved workflow management for a related group of jobs. A group of related jobs are received from a job source and are processed independently and in accordance with an associated job type for each job. The jobs may be processed and reprocessed independent of all other jobs in the group and may be processed substantially concurrently or in parallel. A group workflow manager assures synchronization of the jobs to generate the expected order in the output. The synchronization is defined by synchronization actions processed as part of the workflow processing. The synchronization actions may be defined in the job type of each job, or in a group job type, or defined by user interaction.

16 Claims, 5 Drawing Sheets

PROCESSING A GROUP OF JOBS SUBSTANTIALLY INDEPENDENTLY WHILE SYNCHRONIZING AND MAINTAINING THE ORIGINAL ORDER OF THE JOBS AT APPROPRIATE POINTS IN A WORKFLOW

BACKGROUND

1. Field of the Invention

The invention relates generally to workflow processing and more specifically relates to improved workflow processing to permit a group of related jobs to be processed substantially independently while synchronizing and maintaining the original order of the jobs at appropriate points in the workflow.

2. Discussion of Related Art

In high volume (e.g., "print shop") printing environments, it is common that print jobs involve a number of steps for intermediate processing between the initial intake/reception of the print job and the completed output of the print job through the printing system. Often, such high volume printing environments utilize programs referred to as workflow management systems to control and sequence a print job through the various steps required to complete the presentation output. For example, printing may involve initial ripping or rasterizing of the print job's source data, resources external to the source data may be utilized in performing such ripping or rasterizing, the rasterized page images may be formatted for presentation on a particular, available type or size of paper, the images may then be imprinted on selected paper, and the printed images may then be post-processed by folding, stuffing, stapling, cutting, collating, etc. Each of these various processing steps may be defined as actions in a workflow job type associated with the print job. Thus the workflow manager processes a particular print job by initiating, and following progress each step of the sequence of actions as defined by a job type associated with the print job. Exemplary of a typical, commercially available workflow processing system in the print shop context is the IBM Infoprint Manager ("IPM") or the IBM Infoprint ProcessDirector ("IPPD").

In some high volume printing environments, a plurality of such jobs may be communicated from a job source to the presentation/printing system. In addition, a single, more complex job may be received from a job source and divided into multiple smaller, simpler jobs by processing within the printing enterprise. Though each of the individual jobs may have certain unique attributes, actions, and steps to be processed separately and independently from other jobs, the collection of multiple jobs may be logically grouped by the printing environment such that the plurality of jobs are processed as a single job by the workflow manager (e.g., a "group job" or a "meta-job").

In normal workflow processing systems, individual jobs can go through any workflow defined by their respective job type. Each job is processed independently and may therefore jump ahead or get "passed" by other jobs as they move through the workflow. Each job will process a step in its workflow as fast as it can and then move to the next step. If a set of jobs were treated this way, they could very easily become out of order. Current workflow processing systems have some limited concepts for defining a group or set of related jobs. Present workflow processing systems provide little flexibility in processing such related groups of jobs in that individual jobs of the group may be processed without the flexibility to apply special processing parameters and steps defined by the job's job type. In other words, all jobs in a group of related jobs are processed in accordance with only one generic job type. For example, all jobs of the group are processed with reference only to common job steps applicable to all jobs of the group—i.e., a "lowest common denominator" of job type processing. Special processing for individual jobs of the group may be disallowed by present workflow management systems. In addition, if one job of the group of related jobs generates an error condition and must be reprocessed, present workflow management systems typically require that all jobs of the group (logically aggregated as a single job for management purposes) must be reprocessed.

Thus, present workflow management systems as utilized, for example, in high volume print shop applications are inflexible as regards the processing of such related groups of jobs. Similar issues arise in other workflow management applications other than high volume print shop applications. Numerous other applications utilize similar workflow management concepts to permit groups of related jobs to be processed. Thus, the problems of inflexible workflow management also arise in other contexts.

It is evident from the above discussion that a need exists for improved methods and systems for flexible workflow management especially as relates to processing of multiple related jobs. A particular need exists in the context of high volume print shop workflow management systems.

SUMMARY

The present invention solves the above and other problems, thereby advancing the state of the useful arts, by providing methods and systems for improved flexibility in workflow management in processing of a plurality of related jobs. In one exemplary embodiment, a plurality of related print jobs is received from a job source. The original ordering of the jobs as received from the job source is maintained in the final output however the improved workflow management methods and systems hereof permit the plurality of jobs to be processed substantially concurrently and in a different order than that in which they are received. Further, each individual job may be processed in accordance with its own unique job type definition while the group of related jobs may be processed in accordance with workflow actions associated with the entire group as a meta-job. The present invention allows synchronization so that parallel processing of individual jobs may alternate with sequential processing of the entire group.

In one aspect hereof a method is provided for managing workflow processing of related jobs in a presentation environment. The method includes receiving a plurality of related jobs wherein the jobs are related as belonging to an identified group of jobs. The method then associates a workflow processing job type with each of the plurality of jobs and associates a workflow processing job type with a meta-job representing the identified group. The method then processes the meta-job in accordance with the job type associated with the meta-job to present to a user output generated by the plurality of jobs. The step of processing comprises processing each job of the plurality of jobs separately in accordance with its associated job type.

In another aspect a program product is provided that embodies a method for workflow management. The method includes receiving a plurality of related print jobs from a job source, each print job having an associated job type. The method then commences processing of the plurality of related print jobs wherein each job is processed independently of all other print jobs and in accordance with an associated job type and wherein multiple of the plurality of related print jobs are processed substantially concurrently. The method then synchronizes the processing of the plurality of related print jobs in response to synchronization actions associated with the plurality of related print jobs. The synchronizing assures that the plurality of related print jobs is completed in the order in which they were received.

Still another aspect hereof provides a system for processing workflow of a plurality of related jobs. The system includes a job receiver for receiving a plurality of related jobs from an external job source and includes a plurality of workflow processors each adapted to perform one or more workflow actions on behalf of one or more jobs of the related job. The system also includes a group workflow manager communicatively coupled to the job receiver and communicatively coupled to the plurality of workflow processors and adapted to assure synchronization of the processing of plurality of related jobs in response to synchronization actions associated with the plurality of related jobs.

DETAILED DESCRIPTION OF THE DRAWINGS

FIGS. 1 through 5 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
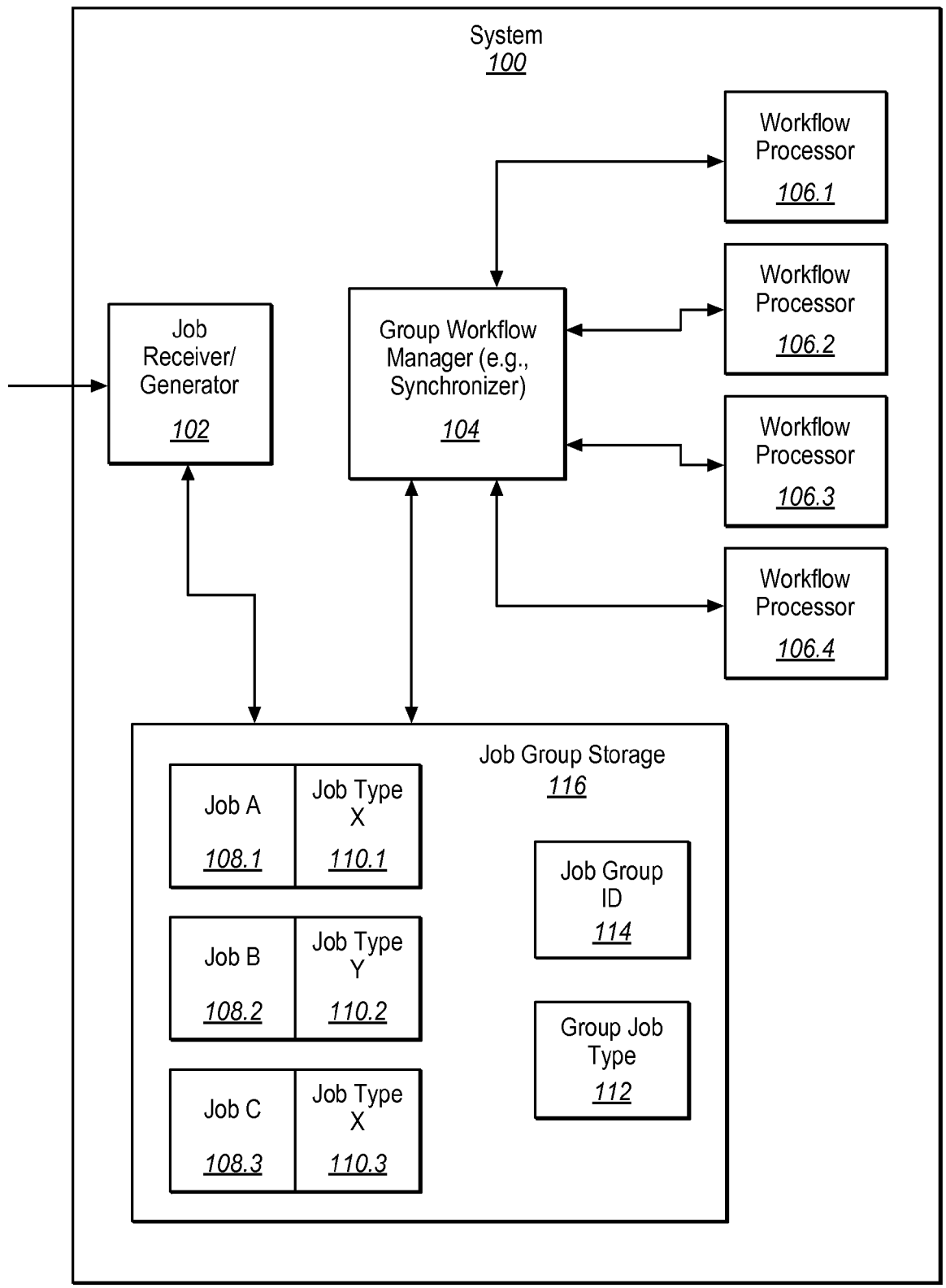
FIG. 1 is a block diagram of an exemplary workflow processing system in accordance with features and aspects hereof to improve processing of a group of related jobs.

FIG. 1 is a block diagram of a system 100 enhanced in accordance with features and aspects hereof to manage workflow processing of a plurality of related jobs received from an external job source. A sequence of related jobs is received by a job receiver/generator element 102 from an external job source (not shown). Examples of an external job source may include an IBM MVS system or an IBM AFP system that generates print jobs or files all related as a larger print job to be produced by a print shop facility. Though the job source may generate the larger job as a plurality of individual, separate jobs or files, the job source also typically indicates that the multiple jobs are related and should be processed to completion as a larger, meta-job. The job source may identify the plurality of jobs as related by providing meta-data that associates the plurality of independent jobs or files as a single larger meta-job. For example, the received files or jobs may be correlated as a group by naming convention used for the naming each of the plurality of related jobs. Or, for example, the jobs may be correlated by meta-data transmitted from the job source in addition to the plurality of jobs such as a list of the various job or file names to be associated as a single, larger, meta-job. Any suitable technique or structure may be used by the job source to identify the received jobs or files as correlated in a related group.

The plurality of jobs may be received as multiple, separate jobs each transmitted from any attached job source. Equivalently, the plurality of jobs may be initially received from a job source as a single larger, complex job and may then be subdivided by processing of job receiver/generator 102 of system 100 to separate out the plurality of jobs as simpler, separate jobs divided out from the received, single, complex job.

Each individual received job or file may be associated with a corresponding job type. For example, job group storage 116 of system 100 may be accessed by job receiver to store the sequence of received, related jobs. "Job A" 108.1, "Job B" 108.2, and "Job C" 108.3 represent a sequence of three related jobs or files transmitted from the external job source and received by the job receiver element 102. Job A may be associated with job type "X" 110.1, job B may be associated with a different job type "Y" 110.2, and job C may be associated with the same job type "X" 110.3 as was associated with job A. The association of a particular job type with each received job may also utilize any appropriate technique or structure for establishing the proper association of a job with its job type.

For example, the job or file name as received from the external job source may indicate the job type to be associated with the received job. Or, for example, meta-data received as a part of the job or file may identify the particular job type of the received job or file. For example, a group of jobs may be associated in a group by a portion of the job name that is common to all jobs of the group. "10000" or "MyGroupJob" could be a portion of the job name associated with each job. A suffix such as "10000.1", "10000.2", "MyGroupJob.1", "MyGroupJob.2", etc. could identify each job of the group of related jobs.

Or, for example, an MVS print job may consist of several MVS datasets that are to be printed in order. The print job is routed to an Infoprint ProcessDirector input device using the MVS Download protocol. The protocol identifies each MVS dataset as the first of the group, as a middle member of the group, or as the last dataset in the group. The ProcessDirector input device then creates a job for each dataset and associates them together as a group. The input device defines two job types: one to print a dataset, and one to handle datasets that have errors. If an MVS dataset's Job Control Language file identifies it as an error dataset, then the input device assigns the error job type. Otherwise, it assigns the normal job type.

Group workflow manager element 104 is also coupled to job group storage 116 and thus communicatively coupled with job receiver element 102. In the alternative, job receiver element 102 and group workflow manager 104 may be directly coupled such that group workflow manager 104 receives jobs from element 102 and stores the jobs/files as desired. Group workflow manager element 104 may assign a group ID 114 to the related jobs (108.1 through 108.3) received by job receiver element 102. Further, group workflow manager element 104 may assign a group job type 112 to the related group of jobs identified by job group ID 114.

In accordance with features and aspects hereof, group job type 112 and/or the individual job types (110.1 through 110.3) associated with each job may include pre-defined synchronization actions to identify points within the processing of each job at which all jobs must synchronize to help ensure proper ordering of the final generated output or to assure proper ordering of processing at any point in the processing of the group of jobs. Such synchronization actions may be defined by any suitable semantic and syntax within the job type or group job type definitions. For example, a particular job processing step may be defined and called "Wait_for- _group" indicating that the particular job processing should pause until all related jobs of the group encounter the same synchronization point. In the alternative, group workflow manager element 104 may interact with a user (not shown) of system 100 to permit a user to manually define desired synchronization points in the processing of the group of related jobs. However the synchronization actions are associated with a job (as part of the job type or manually added to a job), any number of such synchronization actions may be added to each job at any point where synchronization with other jobs of the group is required.

With such synchronization actions defined by the job types, or the group job type, or by user input, group workflow manager element 104 may commence processing of the group of related jobs. Group workflow manager 104 is then operable in conjunction with a plurality of workflow processors 106.1 through 106.4, each of which may be operable to process one or more of the related group of jobs. Group workflow manager element 104 then monitors progress at each step of processing of each job to assure synchronization as defined by the synchronization actions associated with the group of jobs. Thus group workflow manager 104 is communicatively coupled with each of the workflow processors 106.1 through 106.4 to initiate processing of the various related jobs and to assure synchronization of the jobs based on predefined synchronization actions associated with each job and/or associated with the group of jobs. Each workflow processor may be responsible for processing one or more particular actions or steps in the processing of each job of the plurality of related jobs. Thus, group workflow manager element 104 may assign a particular step or action for a particular job of the plurality of jobs to a particular workflow processor capable of handling that particular selected step or action. When group workflow manager element 104 encounters a "Wait_for_group" synchronization action within processing of any job of the group of related jobs, processing of that job will be paused until all other jobs of the group are processed up to a similar synchronization point. When all jobs of the group have encountered the same synchronization action, all jobs may be released for continued processing by group workflow manager element 104 in cooperation with workflow processors 106.1 through 106.4. Once all jobs in the group are synchronized, the group job type may instruct the workflow system to operate upon the jobs as a single group, in the original group order. For example, the multiple jobs downloaded from MVS might print sequentially on the same printer in the original order. Or, the job types may instruct the workflow system to operate on some jobs independently of the others.

System 100 may therefore represent any workflow processing system adapted for processing a group of related jobs through workflow group workflow manager 104 enhanced in accordance with features and aspects hereof to assure proper synchronization while concurrently processing the job steps. In one exemplary embodiment, system 100 may represent a print shop or printing enterprise wherein the plurality of related files or jobs represents print jobs intended to generate corresponding printed output in the printing system 100. Such print jobs or files may be received from a variety of job sources such as IBM MVS systems, IBM AFP systems, etc. Group workflow manager element 104 therefore manages workflow processing for the group of related print jobs by assuring synchronization of the print jobs as they are sequenced through the various steps defined by the job type associated with each print job and/or the sequencing and synchronization defined by the group job type. In addition, as discussed further herein below, manager element 104 allows for each job of the group to be processed in accordance with the unique needs of its associated job type. Still further, if one job of the group needs to be re-processed for any reason, that one job may be reprocessed without requiring that the entire group be reprocessed as a single larger job.

Numerous additional and equivalent elements may be present in a fully functional workflow system 100. Such additional and equivalent elements are eliminated herein for simplicity and brevity of this discussion but will be otherwise readily apparent to those of ordinary skill in the art. Thus system 100 of FIG. 1 is intended merely as representative of one exemplary embodiment of features and aspects hereof.

Figure 2:
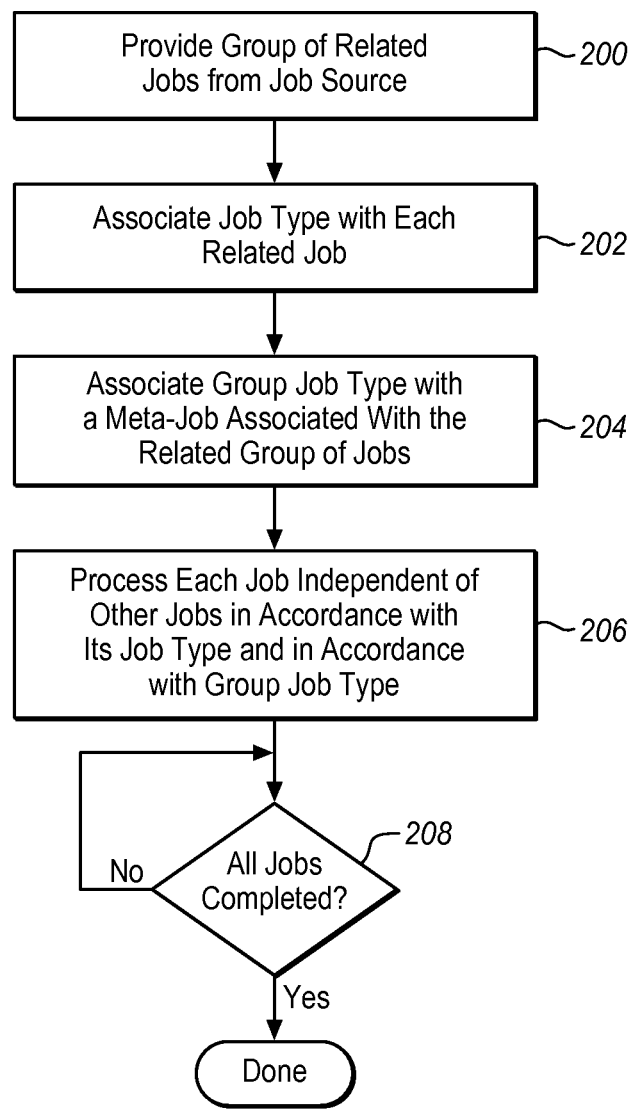
FIGS. 2 through 4 are flowcharts describing exemplary methods in accordance with features and aspects hereof to improve processing of a group of related jobs.

FIG. 2 is a flowchart describing an exemplary method in accordance with features and aspects hereof to perform workflow processing on a group of related jobs in a more flexible and efficient manner. Element 200 represents processing of the workflow system to receive a group of related jobs from an external job source. As noted above, in one exemplary embodiment, the job source may be a system generating a plurality of related print jobs or print files to be processed by the printing system in accordance with workflow management techniques. Also as noted above, the jobs may be provided by processing of the presentation system to subdivide out smaller, simpler jobs from a single, complex job received from a job source. Thus, element 200 represents processing to provide a plurality of related jobs whether received directly from one ore more job sources or whether derived by dividing out a plurality of simpler jobs from a single, complex job received from a job source.

Element 202 next represents processing within the workflow management system to associate a job type with each received, related job. The job type for each job determines the specific set of steps or actions to be performed to process the associated job. For example, in the context of a printing system workflow processor, steps or actions may include requiring a particular type or size of paper, printing the desired images on the selected media, cutting, folding, stapling the printed media and other post processing steps associated with generating the desired final printed output. As generally known in the art, the job type may be associated with a received job by any of several well-known techniques. For example, the name of a received job or file may indicate the job type to be associated with that job or file. Other well-known techniques will be readily apparent to those of ordinary skill in the art for associating a particular job type with each received, related job or file.

Element 204 is next operable to associate a group job type with a meta-job logically defined and associated with the related group of jobs. As noted above, the received plurality of jobs may be associated as a group by any of several well-known techniques. For example, the name of each received job or file may be indicative of the group to which the job or file belongs. In addition, the name of the plurality of related jobs may also indicate the group job type to be associated with the logically defined meta-job. Element 204 therefore represents any suitable processing to associate the received, related jobs or files as a larger, meta-job and associate the group with a corresponding group job type. As noted above, the individual job type associated with each of the plurality of received; related jobs may include pre-defined synchronization actions. In addition or in the alternative, the group job type may include steps or actions to affect all or some of the jobs in the group after synchronization of the plurality of received, related jobs.

Element 206 then represents suitable processing to commence, and eventually complete, processing for each of the received jobs independent of other jobs, in accordance with the job type associated with a job, and in accordance with the group job type associated with the group of received, related jobs. As discussed further herein below, element 206 also represents processing by the group workflow manager to synchronize processing of the various jobs in response to encountering synchronization steps or actions during the processing of each of the plurality of related jobs. In general, element 206 may represent concurrent processing of a variety of actions or steps from each of multiple of the related jobs of the group. Concurrent processing of a plurality of the related jobs may be achieved by any of a number of well known concurrent and/or parallel processing techniques. For example, a single computing system or processor may perform the workflow processing for all of the multiple jobs of the related group by instantiating and executing multiple copies of workflow processing elements all operable on the same computing system. In addition or in the alternative, multiple computing systems and/or processors may be cooperatively operable in parallel to perform processing on the various related jobs of the group. Element 208 then represents processing to await completion of all jobs of the related group. Since the group workflow manager assures that processing of the plurality of jobs is properly synchronized, all jobs will be completed in the desired order corresponding substantially to the order in which the related jobs were received from a job source.

Those of ordinary skill in the art will recognize that one or more of the plurality of jobs may also be removed from the group by processing of the system and the remaining jobs may be allowed to complete without the removed job or jobs processing to completion. Since each job may be processed separately, the removed jobs may not be required to complete the group of related jobs. The removed job or jobs may be completed at a later time, for example, or may simply be discarded as unnecessary for reasons specific to the particular presentation environment.

Figure 3:
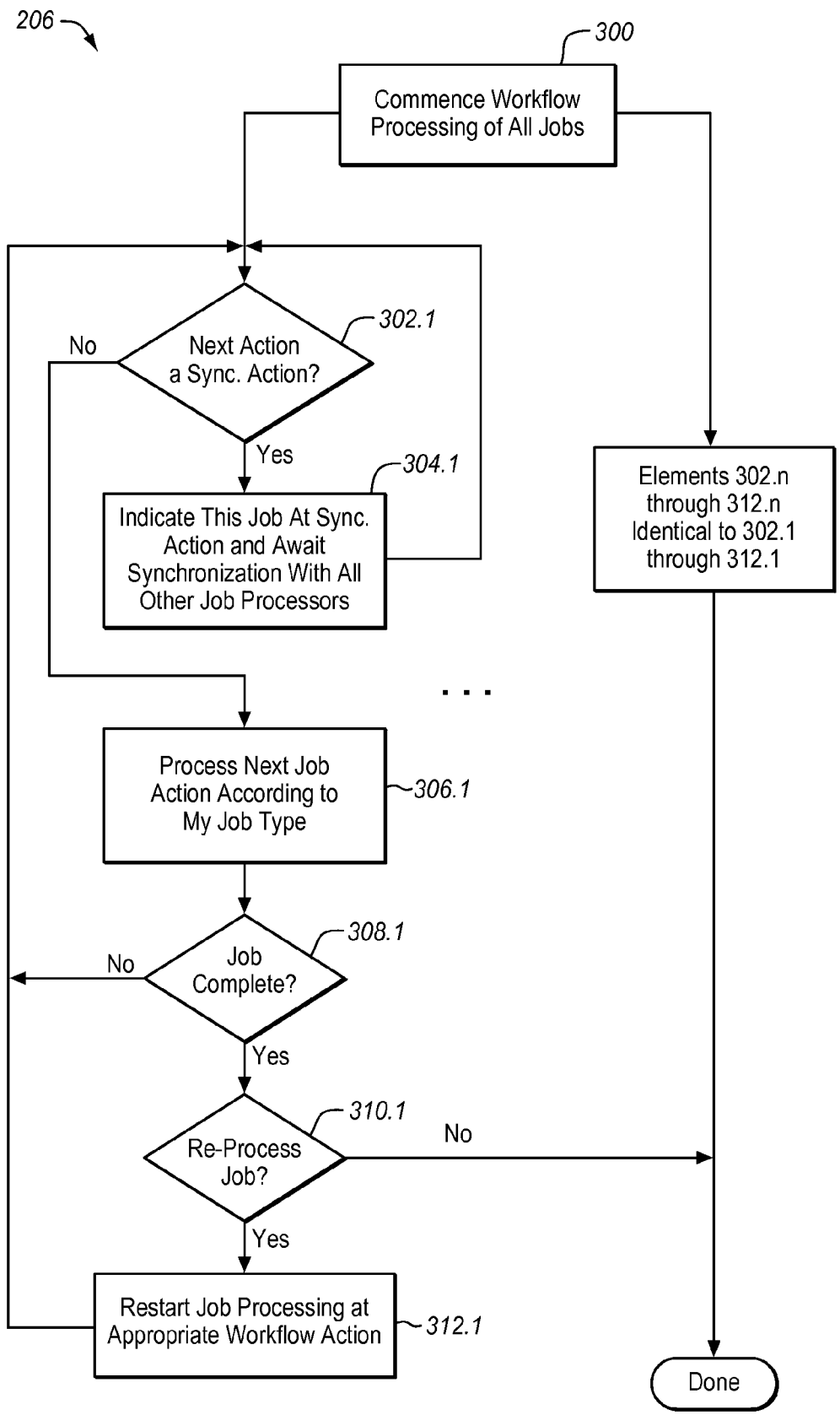

FIG. 3 is a flowchart providing additional exemplary details of the processing of element 206 of FIG. 2. As noted above, element 206 of FIG. 2 generally represents the substantially concurrent processing of steps or actions from multiple jobs of the group of related jobs. Initially, element 300 of FIG. 3 commences workflow processing for multiple or all of the jobs in the group of related jobs. Each of the jobs may commence processing by corresponding instantiation of workflow processing elements and/or by parallel processing or processors each operable on behalf of a corresponding step of a job of the plurality of related jobs.

Elements 302.1 through 312.1 represent processing of one job through the enhanced workflow processing system while elements 302.n through 312.n represent identical processing of another of the group of related jobs. Processing of elements 302.1 through 312.1 will be described with reference to processing of a single job and thus those of ordinary skill in the art will recognize identical processing that may be performed for each of the group of related jobs. The processing may be performed generally within the group workflow manager in conjunction with one or more workflow processors all operable substantially concurrently within a single system or as noted above distributed over multiple parallel operating computing systems.

Element 302.1 is first operable to determine whether the next step or action for this job is a synchronization action. If so, element 304.1 is next operable to indicate that this job has reached the identified synchronization action and to then await synchronization with all other job processors corresponding to other jobs presently being processed by the workflow manager. Processing then continues looping back to element 302.1 to process a next step of this job. Thus, all jobs of the group will perform the next step in the respective job type for each job only after all jobs of the group reach the same synchronization action. If the next action is not a synchronization action, processing of the next job step or action will proceed at element 306.1 according to the job type definition for this job. At the completion of the next job action or step, element 308.1 determines whether the job has completed. If not, processing for this job continues looping back to the element 302.1 to determine the next action or step for processing of this job. If the job has completed, element 310.1 is operable to determine whether the job needs to be reprocessed for any reason. Element 310.1 may entail automatic determinations that a particular job step failed or was not completed successfully as well as optional user input indicating that a job step needs to be repeated or that the entire job needs to be restarted. If the job need not be reprocessed, processing of this job is completed and the workflow manager awaits completion of all other jobs of the group of related jobs. If element 310.1 determines that a step or the entire job needs to be reprocessed, element 312.1 is operable to restart job processing at an appropriate workflow step associated with this job. Processing then continues looping back to element 302.1 to analyze each action or step of the job and perform appropriate synchronization with other jobs presently being processed by the workflow manager.

Figure 4:
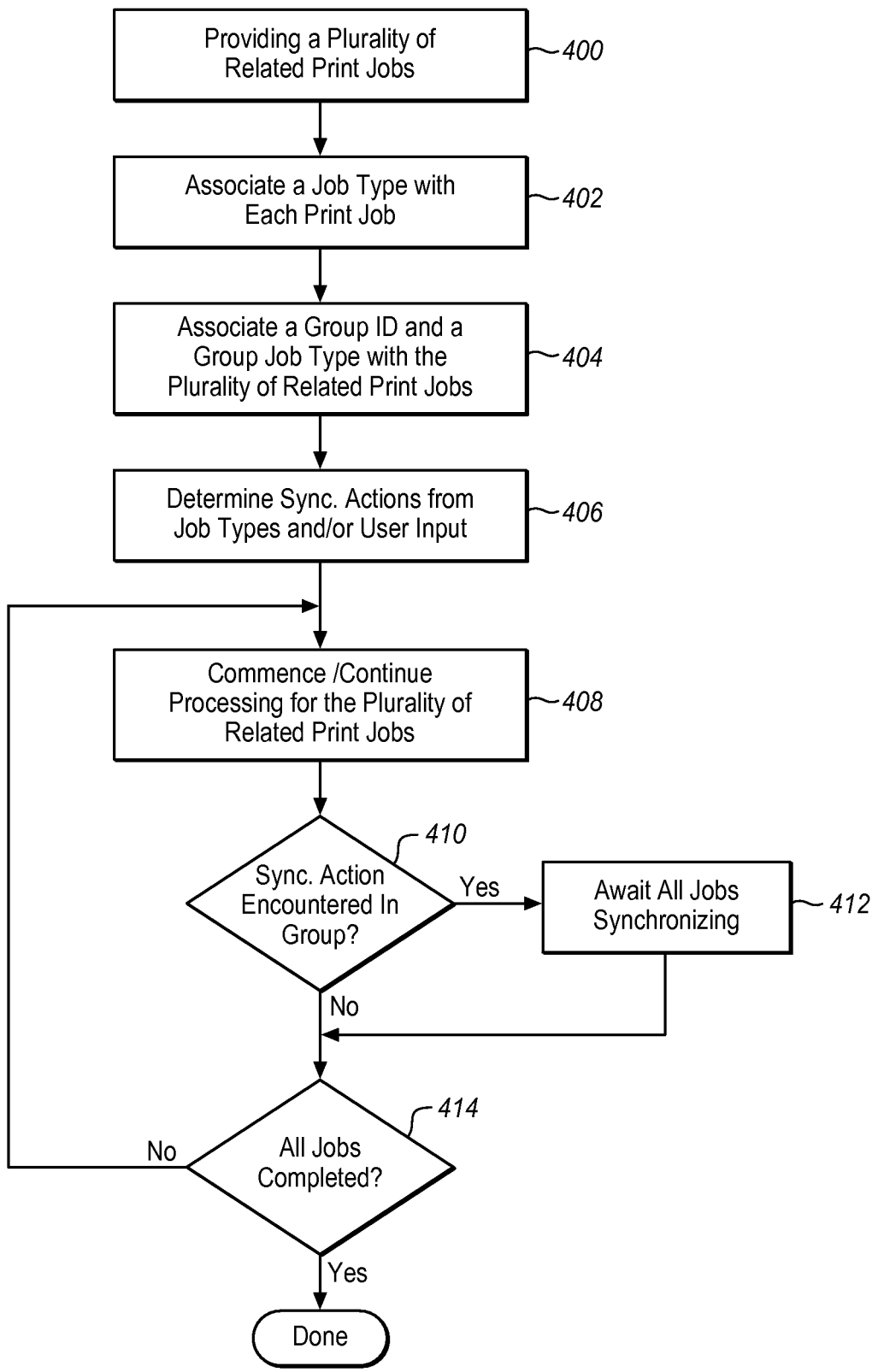

FIG. 4 is a flowchart depicting another exemplary method in accordance with features and aspects hereof as specifically applied to the processing of a group of related print jobs in a print shop or print enterprise environment. Element 400 represents provision of a plurality of related print jobs from an appropriate job source such as an IBM MVS system and/or an IBM AFP environment. As noted above, the plurality of jobs may be provided by reception of the plurality of related jobs from one ore more job sources. Equivalently, the plurality of jobs may be derived by processing of the system to divide a large, complex job received from a job source into the desired plurality of smaller, simpler jobs.

For each job, element 402 represents appropriate processing to associate a print job type with the received print job. Those of ordinary skill in the art will recognize that processing of elements 400 and 402 may be combined in that a job type may be associated with each received job as the job is received. Next, element 404 associates a group ID and a group job type with the plurality of related print jobs. The group ID and group job type may be useful by the workflow manager to maintain association of the related print jobs and to provide required synchronization during processing of the related print jobs. Element 406 next determines synchronization actions from the job types associated with each job and/or the group job type. In addition or in the alternative, user input may define synchronization actions to be associated with processing of the various print jobs. Synchronization actions are used as noted above to assure the proper sequencing of the print jobs though the print jobs may be processed independently and substantially in parallel or concurrently.

Elements 408 through 414 are then operable iteratively to commence/continue processing of each of the plurality of related print jobs synchronizing processing as required until all jobs have been completed. Thus element 408 is first operable to commence processing for each job of the plurality of related print jobs or files. As noted above, processing of the various steps of the related print jobs may be performed concurrently within a single computing system or may be distributed over multiple computing systems operating substantially in parallel. The workflow manager serves to coordinate and synchronize processing of the various print jobs in accordance with features and aspects hereof. As the processing of print jobs proceeds through each step defined by the job type associated with each job and/or as defined by the group job type, the workflow manager is operable as indicated by element 410 to determine whether a synchronization action has been encountered by processing of one or more of the plurality of related print jobs. If so, element 412 is next operable to pause processing of each job that encounters the synchronization action until all jobs have encountered the same synchronization point. When all jobs have encountered the same synchronization point, processing continues at element 414 to determine if all jobs have completed processing. If so, the method completes with all jobs processed with output generated in the intended order (i.e., the order of reception of the jobs) though they may have been processed through concurrent or parallel processing in a different order. If some jobs have yet to complete processing, processing continues at element 408 to continue processing of steps or actions of each of the plurality of related print jobs that have not yet completed. Thus processing of elements 408 through 414 continues until all jobs have suitably completed. The workflow manager assures the appropriate synchronization of all the jobs at identified synchronization actions encountered in processing of each of the independent though related print jobs.

Those of ordinary skill in the art will readily recognize numerous additional or equivalent steps that may be performed in the processing of the methods of FIGS. 2 through 4. Such additional or equivalent steps are omitted herein simply for brevity of this discussion but will be otherwise readily apparent to those ordinary skill in the art.

Figure 5:
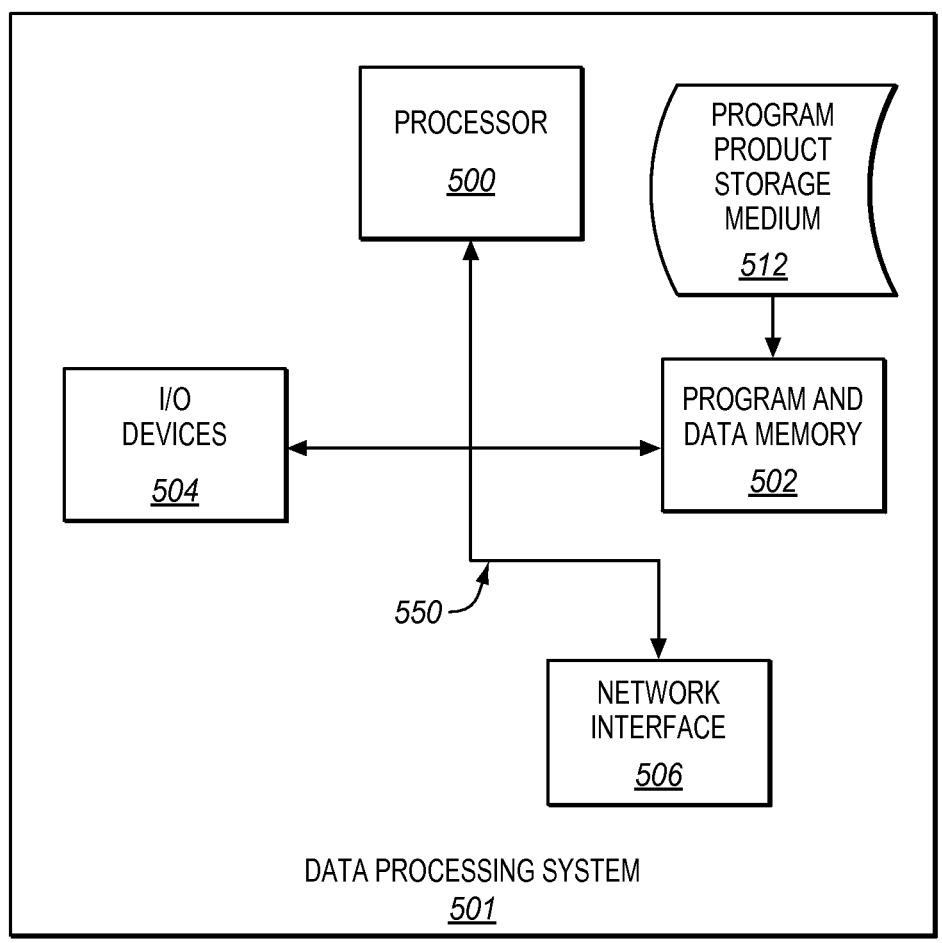
FIG. 5 is a block diagram of a system on which a computer readable medium may embody a method operable in accordance with features and aspects hereof.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 5 is a block diagram depicting a workflow management system 501 as a data processing device adapted to provide features and aspects hereof by executing programmed instructions and accessing data stored on a computer readable storage medium 512.

Furthermore, the invention can take the form of a computer program product accessible from a computer-usable or computer readable medium 512 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor 500 coupled directly or indirectly to memory elements 502 through a system bus 550. The memory elements can include local memory employed during actual execution of the program code, bulk storage, and cache memories which provide temporary storage of at least some program code in order to reduce the number of times code must be retrieved from bulk storage during execution.

Input/output or I/O devices 504 (including but not limited to keyboards, displays, pointing devices, etc.) can be coupled to the system either directly or through intervening I/O controllers. Network adapter interfaces 506 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

What is claimed is:

1. A method for managing workflow processing of related jobs in a printing system, the method comprising:
   receiving a named group of print jobs;
   for each print job of the group, assigning a workflow that includes parameters for printing the job;
   for each print job of the group, including information identifying the name of the group; and
   printing each print job by:
      processing the job according to the printing parameters in its workflow;
      determining, based on the group name for the print job, a checkpoint from multiple checkpoints at which to halt processing of the print job until each job of the group has reached the checkpoint, by:
         parsing the print job to identify the name of the group;
         acquiring a definition indicating how to process groups having the name; and
         reviewing the definition to identify at least one checkpoint for the group;
      halting processing of the job once the checkpoint has been reached;
      determining that each job of the group has reached the checkpoint; and
      resuming processing of the print job responsive to determining that each job of the group has reached the checkpoint.

2. The method of claim 1 wherein the checkpoints are used to assure proper ordering of processing of the plurality of jobs.

3. The method of claim 1 further comprising:
   determining, based on the group name for the print job, multiple checkpoints at which to halt processing of the print job.

4. The method of claim 1 wherein processing each job comprises: processing some of the jobs substantially concurrently.

5. The method of claim 4 wherein the group of jobs have an initial order, wherein the group of jobs are processed in an order different than the initial order, and wherein the checkpoints assure the group of jobs are completed in the initial order.

6. The method of claim 5 wherein the initial order is determined by the order in which the group of jobs are provided.

7. The method of claim 1 wherein halting processing of each job comprises reporting to the printing system that the print job has reached the checkpoint.

8. The method of claim 1
wherein the step of receiving further comprises:
receiving a single complex job from a job source coupled to the printing system; and
generating the group of jobs from the single complex job.

9. A non-transitory computer program product comprising a computer readable medium embodying a computer readable program, wherein the computer readable program when executed on a workflow management computer causes the computer to perform the steps of:
receiving a named group of print jobs;
for each print job of the group, assigning a workflow that includes parameters for printing the job;
for each print job of the group, including information identifying the name of the group; and
printing each print job by:
processing the job according to the printing parameters in its workflow;
determining, based on the group name for the print job, a checkpoint from multiple checkpoints at which to halt processing of the print job until each job of the group has reached the checkpoint, by:
parsing the print job to identify the name of the group;
acquiring a definition indicating how to process groups having the name; and
reviewing the definition to identify at least one checkpoint for the group;
halting processing of the job once the checkpoint has been reached;
determining that each job of the group has reached the checkpoint; and
resuming processing of the print job responsive to determining that each job of the group has reached the checkpoint.

10. The program product of claim 9 wherein
the checkpoints are used to assure proper ordering of processing of the plurality of jobs.

11. The program product of claim 9 wherein the method further comprises:
determining, based on the group name for the print job, multiple checkpoints at which to halt processing of the print job.

12. The program product of claim 9 wherein processing each job comprises:
processing some of the jobs substantially concurrently.

13. A system for processing workflow of a plurality of related jobs, the system comprising:
a job receiver for receiving a named group of print jobs from an external job source;
a plurality of workflow processors each adapted to process received print jobs according to printing parameters in workflows for those jobs ; and
a group workflow manager implemented at a hardware processor, communicatively coupled to the job receiver and communicatively coupled to the plurality of workflow processors and adapted to determine, for each print job based on the group name for the print job, a checkpoint from multiple checkpoints at which to halt processing of the print job until each job of the group has reached the checkpoint, to halt processing of the job once the checkpoint has been reached, to determine that each job of the group has reached the checkpoint; and to resume processing of the print job responsive to determining that each job of the group has reached the checkpoint,
wherein the group workflow manager is further adapted to assign a workflow that includes parameters for printing the job to each print job of the group, to include information identifying the name of the group to each print job of the group, and to determine a checkpoint for each print job by parsing the print job to identify the name of the group, acquiring a definition indicating how groups of the name are processed, and reviewing the definition to identify at least one checkpoint for the group.

14. The system of claim 13
wherein the group workflow manager is further operable to determine the checkpoints to assure proper ordering of processing of the plurality of jobs.

15. The system of claim 13
wherein the group workflow manager is further adapted to determine, based on the group name for each print job, multiple checkpoints at which to halt processing of the print job.

16. The system of claim 13
wherein the system is embodied within a printer, and
wherein each job of the group of jobs is a print job representing data to be presented to a user by the printer.

* * * * *